(12) United States Patent
Schneider et al.

(10) Patent No.: US 8,590,837 B2
(45) Date of Patent: Nov. 26, 2013

(54) DEVICE FOR HOLDING LUGGAGE IN A PASSENGER CABIN OF AN AIRCRAFT

(75) Inventors: Uwe Schneider, Jork Königreich (DE); Bernd Ehlers, Hamburg (DE)

(73) Assignee: Airbus Operations GmbH (DE)

( * ) Notice: Subject to any disclaimer, the term of this patent is extended or adjusted under 35 U.S.C. 154(b) by 299 days.

(21) Appl. No.: 13/123,320

(22) PCT Filed: Oct. 7, 2009

(86) PCT No.: PCT/EP2009/063035
§ 371 (c)(1),
(2), (4) Date: Apr. 8, 2011

(87) PCT Pub. No.: WO2010/040776
PCT Pub. Date: Apr. 15, 2010

(65) Prior Publication Data
US 2011/0192935 A1 Aug. 11, 2011

Related U.S. Application Data

(60) Provisional application No. 61/195,817, filed on Oct. 10, 2008.

(30) Foreign Application Priority Data

Oct. 10, 2008 (DE) .......................... 10 2008 051 240

(51) Int. Cl.
*B64D 9/00* (2006.01)
(52) U.S. Cl.
USPC .......................... 244/118.1; 312/248; 296/37.8

(58) Field of Classification Search
USPC ............ 244/118.1, 118.5; 296/37.8; 312/246, 312/248
See application file for complete search history.

(56) References Cited

U.S. PATENT DOCUMENTS

| 4,275,942 A | 6/1981 | Steidl |
| 5,108,048 A | 4/1992 | Chang |
| 5,383,628 A | 1/1995 | Harriehausen et al. |
| 5,820,076 A | 10/1998 | Schumacher et al. |

(Continued)

FOREIGN PATENT DOCUMENTS

| DE | 19540929 A1 | 5/1997 |
| DE | 10001038 A1 | 9/2001 |

(Continued)

OTHER PUBLICATIONS

International Search Report, PCT/EP2009/063035, dated Jun. 10, 2010.

*Primary Examiner* — Rob Swiatek
(74) *Attorney, Agent, or Firm* — Lerner, David, Littenberg, Krumholz & Mentlik, LLP (57) ABSTRACT

A device for holding luggage in a passenger cabin of an aircraft is arranged above a seat row in a passenger cabin of an aircraft or a vehicle and fastened to a structure which is fixed to the aircraft. The luggage rack includes an outer housing which is fixed in position and into which a separate inner housing is fit in a positive-locking manner. The inner housing is arranged relative to the outer housing so that the inner housing can move between two end positions about a moving pivot point close to the center of gravity in a force-operated manner. In the closed end position, the luggage rack is visibly integrated into a cabin lining of the passenger cabin.

12 Claims, 5 Drawing Sheets

(56) References Cited

U.S. PATENT DOCUMENTS

| | | | |
|---|---|---|---|
| 5,921,029 | A | 7/1999 | Stukerjurgen |
| 6,547,184 | B2 | 4/2003 | Nieberle |
| 6,886,781 | B2 | 5/2005 | Lau et al. |
| 7,717,009 | B2 * | 5/2010 | Cho .................................. 74/422 |
| 7,823,830 | B2 | 11/2010 | Feldkirchner et al. |
| 8,328,265 | B2 * | 12/2012 | Danz et al. ................... 296/37.8 |
| 2001/0011692 | A1 | 8/2001 | Sprenger et al. |
| 2006/0132007 | A1 | 6/2006 | Beckley |
| 2006/0157620 | A1 | 7/2006 | Granzeier et al. |
| 2008/0078871 | A1 | 4/2008 | Munson et al. |
| 2008/0277527 | A1 | 11/2008 | Fokken et al. |
| 2009/0250553 | A1 | 10/2009 | Bock |

FOREIGN PATENT DOCUMENTS

| | | |
|---|---|---|
| DE | 10127879 A1 | 7/2002 |
| DE | 102004053140 A1 | 5/2006 |
| DE | 102005054890 A1 | 5/2007 |
| EP | 0594997 A1 | 5/1994 |
| EP | 1216920 A1 | 6/2002 |
| WO | 2006087183 A1 | 8/2006 |
| WO | 2007048916 A1 | 5/2007 |
| WO | 2008012427 A1 | 1/2008 |

* cited by examiner

DEVICE FOR HOLDING LUGGAGE IN A PASSENGER CABIN OF AN AIRCRAFT

CROSS-REFERENCE TO RELATED APPLICATIONS

This application is a national phase entry under 35 U.S.C. §371 of International Application No. PCT/EP2009/063035, filed Oct. 7, 2009, published in German, which claims the benefit of the filing date of German Patent Application No. 10 2008 051 240.0 filed Oct. 10, 2008 and of U.S. Provisional Patent Application No. 61/195,817 filed Oct. 10, 2008, the disclosures of which applications are hereby incorporated herein by reference.

TECHNICAL FIELD

The invention relates to a device for storing luggage, which device forms a stowage compartment for luggage, also referred to as a "hatrack". This hatrack, intended in particular for passenger cabins in aircraft, which hatrack comprises at least one housing, is movably arranged above seat rows and is fastened to a structure that is fixed to the aircraft. Furthermore, the present invention also relates to stowage compartments for luggage, or to hatracks, in other means of transport, for example in rail-bound vehicles, preferably in high-speed trains or in buses or coaches.

BACKGROUND TO THE INVENTION

In passenger cabins of aircraft, above the seat rows, stowage compartments are provided for stowing the cabin luggage of passengers during the flight. Such hatracks can be integrated in such a manner that on the one hand the freedom of movement of passengers is not restricted, and on the other hand these stowage compartments can be conveniently accessed in order to remove and deposit luggage. Design, arrangement and operation of the device for storing luggage, also referred to as a hatrack, a fixed or moving bin or an overhead stowage compartment (OHSC), is one of the factors determining passengers' comfort and wellbeing in the cabin. In particular during the takeoff and landing phases, as well as in emergencies, overhead stowage compartments in aircraft are subjected to very high mechanical loads and must thus meet mandatory aviation safety standards relating to their fatigue strength and behaviour in the case of a crash.

The design of conventional hatracks often comprises a rigid housing with a fixed bottom as well as an upwards-opening lid. These embodiments share a common characteristic in that stowage and removal of items of luggage are arduous because of the confined spatial arrangement and limited accessibility of the hatrack as a result of its comparatively high positioning. In particular, persons of short stature are thus faced with difficulties when removing luggage. Furthermore, these hatracks lack the appearance of integration in the cabin lining.

From U.S. Pat. No. 4,275,942 A a hatrack in the form of a shell is known, which hatrack can be swivelled from a closed stowage position or rest position to an open loading position. In this arrangement the access opening for passengers results from a height difference between a lower housing edge and the front edge of the hatrack in the lowered position. This arrangement has been associated with a disadvantage in that this hatrack swivels as far as the head region of the passengers in the seated position.

WO 2007/048916 A relates to an overhead hatrack for aircraft, which hatrack for storing luggage includes a movable housing. The housing, which in a transport position is arranged so as to be inclined, can be swivelled on an off-centre pivot point to a loading position or unloading position. In the closed position or the transport position this hatrack requires effective locking of the housing to protect passengers from falling items of luggage. Due to the pivot point of the housing, which pivot point is arranged off-centre, closing the hatrack requires a relatively substantial effort.

In the transport position the overhead hatrack for aircraft according to WO 2008/012427 A is arranged so as to be inclined. In the loading or unloading position the hatrack is swivelled in the direction of the passenger on a pivot point that is positioned off-centre. Synchronously to this a cabin wall element which is arranged alongside the hatrack is swivelled upwards in order to facilitate access to the hatrack. This concept requires a relatively large cabin wall region. Furthermore, the individual cabin wall elements, which are movable separately to each other, require complex kinematics that require regular maintenance as well as readjustment in order to maintain equal gap dimensions between the cabin wall elements and the hatrack.

SUMMARY OF THE INVENTION

It is the object of the invention to implement a hatrack with improved reachability in the loading position and unloading position, which hatrack can be operated using minimal force and in the closed position is integrated in a cabin wall element.

The above-mentioned object is met by a hatrack, by a passenger cabin of an aircraft and by a method for arranging and installing a hatrack, with the features of the independent claims.

According to an embodiment of the invention, the hatrack according to the invention comprises an external housing that is fixed in place and arranged in a space of an aircraft fuselage, into which external housing a separate internal housing that forms a luggage receptacle is fitted in a positive-locking manner. The internal housing is arranged relative to the external housing, so as to be movable between two end positions, in a force-guided manner on a moving slidable pivot in close proximity to the centre of gravity. In a closed end position the hatrack is visually integrated in a wall element of the passenger cabin, which wall element is also referred to as the cabin lining.

By means of the concept according to the invention a hatrack that meets the object of the present invention and comprises an adequate luggage volume is implemented, which hatrack instead of moving in a simple rotary movement carries out a force-guided movement with a moving pivot of the internal housing. Based on the moving pivot in close proximity to the centre of gravity of the hatrack, advantageously minimal manual force is required irrespective of the load state during adjustment in a force-guided manner, so that great operating comfort of the hatrack is achieved. The movement path resulting from movement in a force-guided manner can advantageously be designed in such a manner that it moves between two ideal end positions. A first end position, which occurs when the hatrack is closed, makes possible an alignment close to the fuselage. With the second end position a position of the hatrack that allows easy loading can be achieved. Advantageously, the movement of the hatrack in a force-guided manner results in a construction by means of which optimal swivel movement can be achieved, and consequently dead spaces in the pivot region are minimised and at the same time the hatrack does not have a negative influence on the design of the passenger cabin in order to achieve a cabin that is constructed as generously as possible. Furthermore, due to the actuation movement of the internal housing, which actuation movement takes place in a force-guided manner, ergonomically favourable loading heights of the hatrack can be defined that facilitate the placement of items of luggage. In the loading and unloading position of the hatrack according to the invention an almost horizontal position of the bottom of the housing results, which position in conjunction with an ergonomically favourable height makes it possible to optimally use the hatrack without causing interference to passengers in the seat rows. By influencing the force-guided movement of the internal housing, which influencing makes it possible to almost freely define the actuating movements or movement paths as well as the end positions of the hatrack or of the internal housing, a large degree of freedom, in particular in relation to the Y- and Z-positions in the aircraft results. Furthermore, as a further advantage there is the possibility for the hatrack according to the invention to be able to also be used in aircraft with smaller cross sections. Moreover, the concept according to the invention makes it possible to implement airline-specific adaptation of the loading height. The hatrack according to the invention, which hatrack comprises optimal functionality, good stability and functional reliability, can be more easily integrated in the aircraft fuselage so that overall a more economical hatrack can be implemented. The design, including movement in a force-guided manner, of the hatrack according to the invention advantageously results in improved failure safety in the case of a crash. Furthermore, the hatrack according to the invention meets the safety requirements, which among other things provide protection to the passengers against falling items of luggage even under extreme loads.

According to a further exemplary embodiment of the invention, for a rotary movement of the internal housing in a force-guided manner said internal housing on both face sides comprises two diagonally offset gearwheels that are connected by means of a belt. In the installed state both gearwheels engage two opposing toothed rack guides that extend in an arc shape relative to each other, which toothed rack guides have been incorporated in the face walls of the external housing. This force guidance guided by toothed racks ensures a moving pivot, which advantageously is in close proximity to the centre of gravity, between the two end positions of the pivotable internal housing. By way of the toothed rack guides the internal housing can carry out an almost free pivot movement with the aim of reaching the desired end positions ideally in conjunction with an optimised pivot region of the internal housing, which has an advantageous effect on the design of a passenger cabin that is as generous as possible. As a measure for achieving reliable force guidance without jamming, the gearwheels of each face side of the internal housing are interconnected by means of a belt. Each gearwheel that is positioned on the internal housing so as to be stationary and rotatable is associated with a pulley, wherein in each case two pulleys are connected by way of a belt so as to provide a dry belt drive.

Motor-driven adjustment of the internal housing of the hatrack is provided. To implement such servo-assisted adjustment it is beneficial to use a servo motor that advantageously by way of an angle drive establishes a drive connection to a shaft that connects two gearwheels at opposite face sides of the internal housing. This electrical drive can advantageously be integrated, with a minimum of expenditure and in a space-saving manner, in the bottom of the internal housing without deflection, kinematics or a separate gear arrangement.

As an alternative to motor-driven adjustment, according to the invention manual opening and closing of the hatrack can be provided. To this effect, for easier operation, a recessed grip is preferably incorporated in the bottom of the internal housing. By means of an actuator latch, which is also arranged on the bottom, the servo motor can be controlled, or can be decoupled for manual operation of the hatrack.

According to a further exemplary embodiment of the invention, the internal housing of the hatrack forms a luggage receptacle that is closed except for an access opening, with a largely rectangular cross sectional profile. Starting from an open, largely horizontal loading position, the internal housing of the hatrack arranged above the passenger seat rows can be swivelled to an almost vertical end position, also referred to as the "transport position". By swivelling the internal housing, starting from the loading position, the housing reaches a transport position in which the luggage is safely stowed. During the swivel motion the luggage is transferred, by way of a bottom section that forms a chute, to a region of the internal housing, which region is opposite the access opening. Due to the upward-swivelled position of the access opening in the closed end position, the internal housing advantageously does not require a separate covering lid. The concept according to the invention provides for the external housing, in the closed position of the hatrack, at the same time to fully cover up the access opening of the internal housing. The items of luggage stowed in the hatrack are thus safely stored even in extreme flight situations.

The solution according to the invention provides a further advantage in that in the closed position of the hatrack the internal housing is fully accommodated by the external housing that is integrated in the space of the aircraft fuselage. At the same time the internal housing or its bottom region is inserted in the cabin lining of the passenger cabin, wherein at the same time narrow circumferential gap dimensions that are barely visible result for the internal housing so as to create a seamless transition to adjacent contours (continuous lining). Advantageously, in this manner a desired uniform visual appearance of the ceiling lining and/or of the wall lining in the passenger cabin is achievable, which has an advantageous influence on the overall appearance of the passenger cabin. The design and/or colouration of the bottom region of the internal housing, which region is visible when the hatrack is closed, can be matched to the adjacent cabin lining or it can differ from the aforesaid. According to customer requirements it may make sense to design this bottom region of the housing as a decorative element, which, for example, is placed in a customer-specific manner onto a standardised housing of the hatrack without this requiring expensive re-certification.

According to a further embodiment of the invention, the external housing of the hatrack is detachably connected to the structure that is fixed to the aircraft, such as the frame elements, stringers or other structural elements in the region of the aircraft fuselage. Fastening can take place directly or indirectly by way of holding means, for example an external frame. Preferably, snap-and-click closure latches are provided as detachable connection elements, by means of which effective form-locking and/or force-locking fastening of the hatrack can be established.

In order to create a weight-optimised hatrack the external housing and/or the internal housing of the hatrack are produced from a composite material, for example glass-fibre-reinforced plastic (GFRP) or carbon-fibre-reinforced plastic (CFRP). For the purpose of stiffening the bottom of the internal housing it is sensible to design said bottom as a hollow body in which a honeycomb core has been inserted between two cover layers comprising a composite material.

An important aspect of the invention relates to the hatrack being secured in the closed position or in the transport position so as to be fixed in place. To this effect the use of a closure latch, inserted between the internal housing and the external housing, is sensible, which closure latch can preferably be released by way of the recessed grip or the actuator latch of the internal housing. The closure latch, which is preferably placed on the housing, e.g. bonded on, riveted on or screwed on, according to the invention can be covered by a covering element in order to achieve improved safety vis-à-vis the passengers. In addition to providing a protective function, the covering element can be designed as a decorative customer-specific element. Since the covering element does not assume a structural function it can be manufactured in almost any desired form and provides an economical option for implementing different variants or effects of the cabin design.

A further embodiment of the invention includes a rail system by way of which optimal positioning of the hatrack is achievable. By way of the rail system comprising two parallel rails which are fixed to the structure that is fixed to the aircraft the hatrack is slidably guided and can be individually fixed relative to the passenger seat rows. In this arrangement fastening the hatrack takes place, for example, by way of securing elements that engage the rails in a positive-locking manner, which securing elements make it possible, prior to position fixing, to individually slide the hatrack in the rail system.

A further important aspect of the invention provides for the hatrack to be designed as a modular physical unit of the interior of the aircraft, which unit can be used in a type-overarching manner for several sizes of fuselage cross sections of aircraft. By means of a modular design the hatrack according to the invention can advantageously be used for various aircraft with cross sections that differ between aircraft. This modular physical unit, also referred to as a modular construction system, advantageously makes it possible to produce hatracks in larger numbers, with the consequence of reduced unit costs.

According to a further embodiment of the invention, the device is provided for a passenger cabin of an aircraft, wherein the device designed for storing luggage comprises a hatrack arranged above seat rows for passengers. The hatrack includes a single-piece external housing, which in conjunction with detachable holding means is indirectly or directly fastened to a structure that is fix at the aircraft, into which external housing an internal housing, which is closed except for an access opening, is fitted in a form-locking manner. By way of gearwheels in conjunction with toothed rack guides the internal housing is adjustable in a force-guided manner, starting from an open loading position, to a closed transport position and vice versa, wherein the internal housing slides on a moving pivot in close proximity to the centre of gravity. In the closed end position the hatrack is visually integrated in a cabin lining of the passenger cabin.

According to a further exemplary embodiment of the invention, a method for arranging and installing a swivellable device, which comprises an external housing and an internal housing, for storing luggage in the passenger cabin of an aircraft is provided, which method involves the following steps: firstly, in a first method step, joining of a single-piece internal housing takes place, which internal housing for force-guided adjustment preferably comprises a servo motor and on each face side two gearwheels that are connected by way of shafts. The second method-related step provides for inserting the internal housing in the external housing. At this gearwheels of the internal housing engage toothed rack guides of the external housing in order to ensure force-guided adjustment of the internal housing relative to the external housing, during which adjustment a moving pivot, in close proximity to the centre of gravity, of the internal housing arises. The further step provides for individual positioning of the hatrack relative to the passenger seat row on the structure that is fix at the aircraft, for which purpose the hatrack is preferably slidably guided in a rail system. The last method step involves fastening or fixing the external housing of the hatrack to the fixed structure of the aircraft, for example frame elements or stringers in the region of the aircraft fuselage, for which purpose, for example, a form-locking and/or non-force-locking snap connection is provided.

BRIEF DESCRIPTION OF THE DRAWINGS

Below, embodiments of the invention are described with reference to the enclosed figures. The following are shown.

DETAILED DESCRIPTION OF EXEMPLARY EMBODIMENTS

In the following description of FIGS. 1 to 8 at least to some extent identical reference characters have been used for same or corresponding components and elements.

Figure 1:
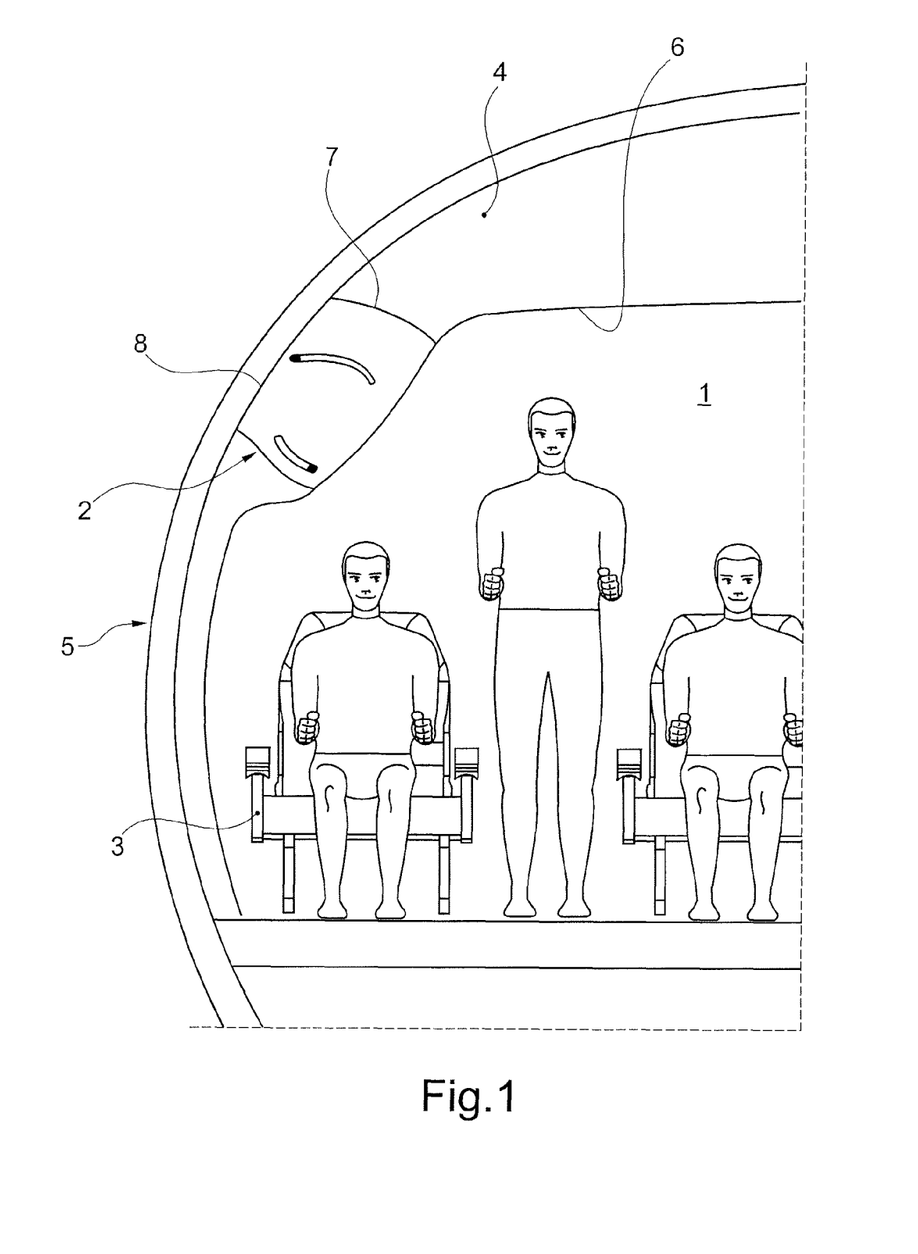
FIG. 1 a section of a passenger cabin of an aircraft.

FIG. 1 shows a section of a passenger cabin 1 of an aircraft, showing the position and arrangement of a hatrack 2 for passengers, which hatrack 2 is located above an outer seat row 3. The hatrack 2 is shown in a closed end position in which said hatrack 2 is completely inserted in a space 4 of an aircraft fuselage 5 and at the same time is seamlessly integrated in an inner cabin wall of the passenger cabin, in a cabin lining 6. For fastening the hatrack 2 an external housing 7 is coupled, in particular by way of detachable fastening elements, to a structure 8 of the aircraft fuselage 5, which structure 8 is fix at the aircraft. FIG. 1 furthermore shows that to the largest extent possible the hatrack 2 is positioned so as to coincide with eye height of a passenger, which simplifies placement and removal of items of luggage to and from the hatrack 2. Moreover, an adequate distance between the hatrack 2 and seated passengers is ensured so that even in its open state the hatrack 2 does not negatively affect said passengers.

Figure 2:
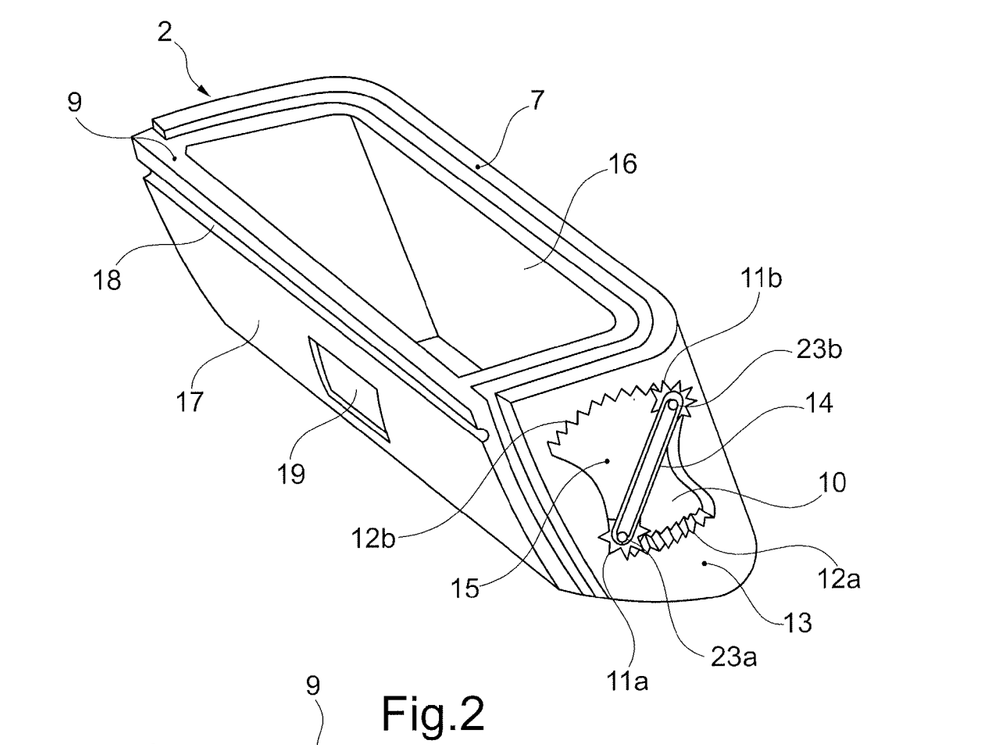
FIG. 2 a perspective view of a hatrack designed according to the invention as an individual component.

FIG. 2 provides a perspective view of the hatrack 2 as an individual component. The external housing 7 forms an almost U-shaped profile into which an internal housing 9 is fitted. In order to achieve a force-guided movement of the internal housing 9 relative to the external housing 7 each face side 10 of the internal housing 9 is associated with two rotatable gearwheels 11$a$, 11$b$ that are diagonally offset relative to each other and that in a form-locking manner engage two opposite toothed rack guides 12$a$, 12$b$ that extend in an arc shape relative to each other, wherein in each case the two toothed rack guides 12$a$, 12$b$ have been incorporated in a face wall 13 of the external housing 7. Each gearwheel 11a, 11b is associated with a pulley 23a, 23b, which are interconnected by way of a belt 14 so as to create a belt drive, and consequently a reliable non-jamming drive of the force guidance is obtained. By way of the toothed rack guides 12a, 12b in conjunction with the gearwheels 11a, 11b the internal housing 9 is held or guided in such a manner that an almost unrestricted swivelling movement occurs in order to reach the desired end positions in an ideal manner and with an optimised swivel region. Force guidance of the internal housing 9 results in a moving pivot 15, in close proximity to the centre of gravity, of the internal housing 9. For manual operation of the internal housing 9 in the region of an access opening 16 in the bottom 17 a recessed grip 18 is provided. As an alternative to this it is beneficial to adjust the internal housing by way of a motor, to which effect an actuator latch 19 is integrated in the bottom 17, by way of which actuator latch 19 a servo motor 20, which is shown in FIG. 4, can be activated.

Figure 8:
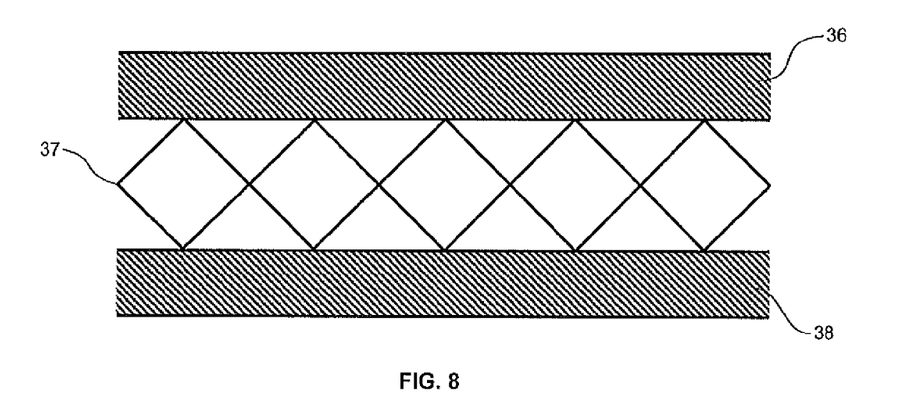
FIG. 8 a schematic view of individual cover layers of a composite material, between which a honeycomb core is inserted.

FIG. 8 schematically illustrates the construction of the bottom of the internal housing 9 where the bottom is made from a composite material comprising a hollow body with a honeycomb core 37 inserted between two cover layers 36,38.

Figure 3:
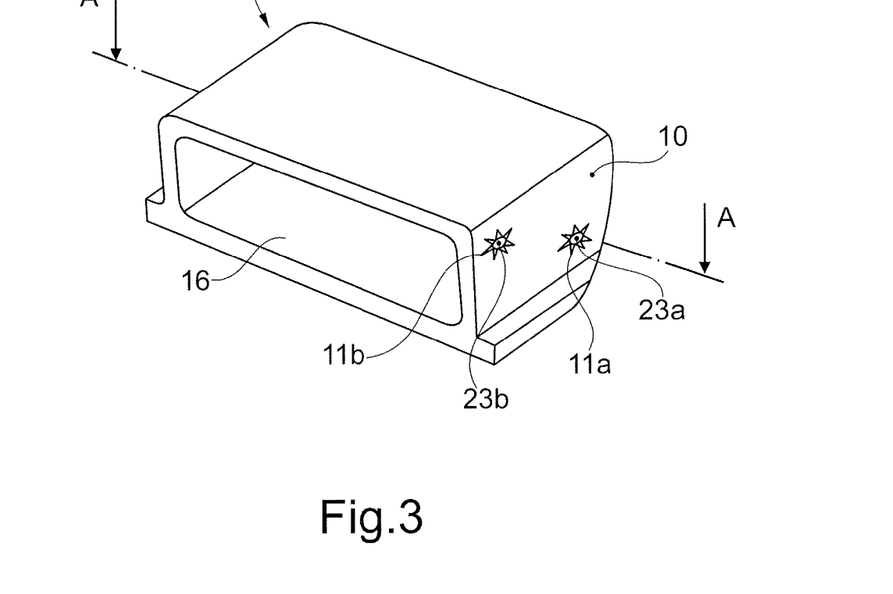
FIG. 3 a perspective view of an internal housing of a hatrack according to the invention as an individual component.

FIG. 3 provides a perspective view of the internal housing 9 as an individual component which except for the access opening 16 forms a closed luggage receptacle which to the greatest possible extent comprises a rectangular cross section profile. Both face sides 10 together with the gearwheel pairs 11a, 11b are in connection with the associated pulleys 23a, 23b.

Figure 4:
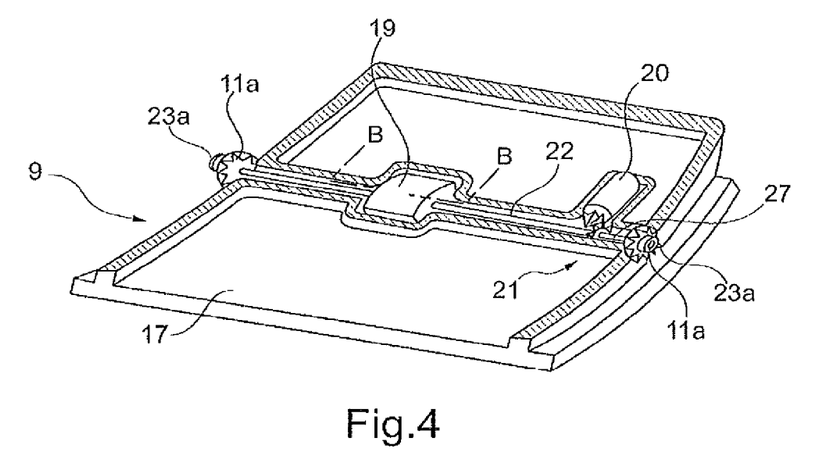
FIG. 4 a section view according to line A-A in FIG. 3.
Figure 5:
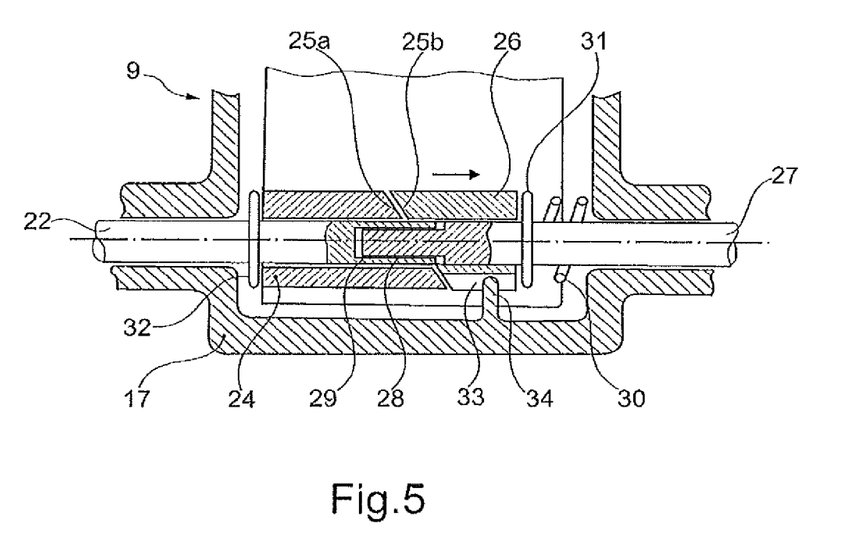
FIG. 5 a section view according to line B-B in FIG. 4.

FIGS. 4 and 5 illustrate an electrical drive of the internal housing 9, which drive comprises a servo motor 20 integrated in the bottom 17 of the internal housing 9, with said servo motor 20 being operatively connected, by way of an angled drive 21, to a shaft 22 that connects gearwheels 11a arranged on the face sides 10 of the internal housing 9. Activation of the servo motor 20 for electrically adjusting the internal housing 9 takes place by way of the actuator latch 19 that is arranged in the bottom 17 of the internal housing 9. As an alternative to an electric-motor-driven drive the internal housing 9 can be operated mechanically. To this effect the servo motor 20 can be decoupled from the angled drive 21 by way of the actuator latch 19. As shown in FIG. 5, this takes place by means of a latch 24 that encompasses the shaft 22. In the region of the latch 24 the shaft 22 is divided, wherein for the purpose of transmitting torque a shaft section 27, for example by way of an external tooth arrangement 28, engages in a form-locking manner a corresponding internal tooth profile 29 of the shaft 22, wherein this form-locking arrangement makes it possible for axial displacement of the shaft section 27 to occur. For decoupling the servo motor 20 the latch 24 is rotated, and consequently the inclined face 25a of the latch 24 interacts with a corresponding face 25b of a pressure cone 26, thus triggering axial displacement of a pressure cone 26 in the direction of the arrow. Supported by the force of a compression spring 30, a thrust washer 31, which is nonrotatably connected to the shaft section 27, is supported by the pressure cone 26 so that axial displacement of the pressure cone 26 at the same time triggers displacement of the shaft section 27, and consequently the driving action of the servo motor 20 is interrupted. Opposite the pressure cone 26 the latch 24 is supported by a thrust washer 32 that is associated with the shaft 22. As a safeguard against rotation the pressure cone 26 comprises a longitudinal groove 33 which is engaged in a form-locking manner by a guide stud 34 that is associated with the internal housing 9. The longitudinal groove 33 extends along a length that exceeds the maximum stroke of the pressure cone 26.

Figure 6:
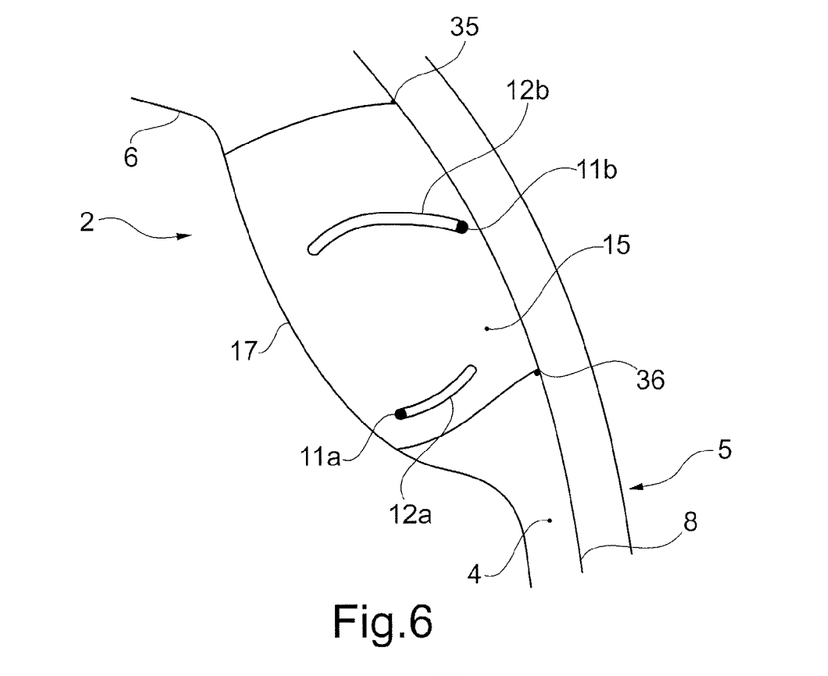
FIG. 6 a section of an aircraft fuselage with the hatrack closed.
Figure 7:
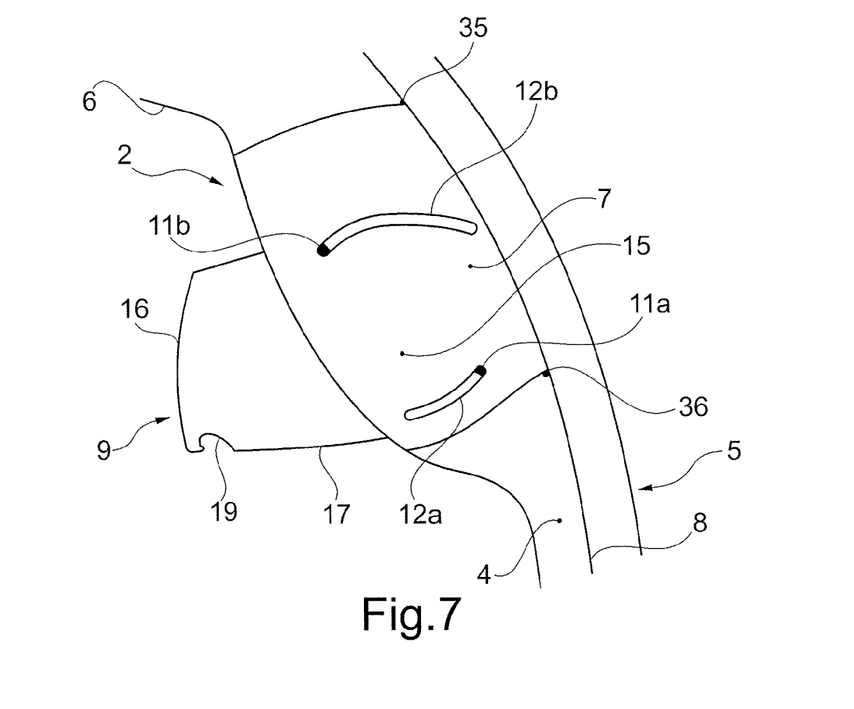
FIG. 7 a section of an aircraft fuselage with the hatrack open.

FIGS. 6 and 7 show a section of the aircraft fuselage 5 with the associated hatrack 2 in a closed first end position that corresponds to the transport position (FIG. 6), as well as in a second end position that corresponds to the open unloading position (FIG. 7). Fastening the hatrack 2 takes place by way of a detachable form-locking and/or force-locking snap connection 35, 36 which is, in particular, designed as a snap-and-click closure, to provide safe and secure fastening to the structure 8 that is fixed to the aircraft, for example frame elements or stringers of the aircraft fuselage 5. For individual adjustment of the hatrack 2 it is beneficial to arrange the aforesaid in rails that extend parallel to each other, which rails are arranged in longitudinal direction of the aircraft. In this arrangement, fastening can, for example, take place with fastening elements integrated in the rails, which fastening elements interact with the snap connections 35, 36. Swivelling the internal housing 9 from the loading or unloading position illustrated in FIG. 7 to the transport position according to FIG. 6 causes the stowed pieces of luggage to be displaced, by way of the floor 17 that forms a chute, to the downwards-pointing trough-shaped region of the internal housing 9. In the transport position the bottom 17 is seamlessly integrated in the cabin lining 6. Mechanical opening of the hatrack 2 to remove items of luggage from the internal housing 9 can take place by way of the recessed grip 19 in the bottom 17. As an alternative to this, electrical adjustment is beneficial, to which effect the servo motor 20 can be activated according to FIG. 4 by way of the actuator latch 19 in the bottom 17 of the internal housing 9.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 Passenger cabin
2 Hatrack
3 Seat row
4 Space
5 Aircraft fuselage
6 Cabin lining
7 External housing
8 Structure
9 Internal housing
10 Face side
11a Gearwheel
11b Gearwheel
12a Toothed rack guide
12b Toothed rack guide
13 Face wall
14 Belt
15 Pivot
16 Access opening
17 Bottom
18 Recessed grip
19 Actuator latch
20 Servo motor
21 Angle drive
22 Shaft
23a Pulley
23b Pulley 24 Latch
25a Face
25b Face
26 Pressure cone
27 Shaft section
28 External tooth arrangement
29 Internal tooth profile
30 Compression spring
31 Thrust washer
32 Thrust washer
33 Longitudinal groove
34 Guide stud
35 Snap connection
36 Snap connection
36, 38 Cover layers
37 Honeycomb core

The invention claimed is:

1. A device for storing luggage in a passenger cabin of an aircraft, the device comprising:
an external housing;
an internal housing;
wherein the external housing is fixed in place in a space of an aircraft fuselage;
wherein the internal housing is configured so as to be movable between first and second end positions, wherein a pivot is located in close proximity to a centre of gravity of the internal housing, the pivot being configured to move in a force-guided manner during a movement of the internal housing;
wherein the device is configured for arrangement above a seat row in a passenger cabin of an aircraft and is configured for fastening to a frame-like structure;
wherein the internal housing is fitted into the external housing, and wherein, in a closed end position, a hatrack is visually integratable in a cabin lining of the passenger cabin; and
first and second gear wheels;
wherein the first and second gear wheels are diagonally offset relative to each other and are connected with a belt; and
wherein the first and second gear wheels are configured for force-guided rotary movement of each face side of the internal housing and are configured to engage, respectively, first and second opposing arc-shaped toothed rack guides incorporated in face walls of the external housing in a form-locking manner.

2. The device of claim 1, further comprising a servo motor for adjusting the internal housing relative to the external housing of the hatrack-, the servo motor being operatively connected to a shaft, via an angled drive, the shaft connecting the first and second gear wheels correspondingly positioned on the face sides of the internal housing.

3. The device of claim 2, wherein the servo motor is controlled by an actuator latch or is decouplable for manual operation of the hatrack.

4. The device of claim 2, further comprising:
at least one automatically operating closure latch;
wherein, when the hatrack is in the closed position, the internal housing is secured by the at least one automatically operating closure latch, the at least one automatically operating closure latch being detachable using a recessed grip at a bottom or an actuator latch of the servo motor.

5. The device of claim 1, further comprising:
a recessed grip at a bottom for manually opening and closing the internal housing.

6. The device of claim 1, wherein the internal housing of the hatrack is of a single-part configuration and comprises a rectangular cross section profile;
wherein the internal housing forms a luggage receptacle closed except for an access opening, the luggage receptacle being swivellable from an open horizontal position to a vertical position; and
wherein the luggage is displaced along a section of a bottom, the section forming a chute.

7. The device of claim 1, wherein, in the closed end position, the hatrack is fully integrated in the space of the aircraft fuselage and is visually integratable in a cabin lining of the passenger cabin; and
wherein a bottom of the internal housing compensates for a cut-out in the cabin lining, cut-out at least one of a design or color of the cut-out matches or differs from the design or color of the cabin lining.

8. The device of claim 1, further comprising:
a form-locking or force-locking snap connection detachably affixing the external housing in the region of the aircraft fuselage to a structure fixed at the aircraft fuselage.

9. The device of claim 1, wherein the external housing or the internal housing of the hatrack are produced from a composite material, selected from the group consisting of glass-fibre-reinforced plastic and carbon-fibre-reinforced plastic, and wherein the construction of a bottom of the internal housing comprises individual cover layers of a composite material, and a honeycomb core between the individual cover layers.

10. The device of claim 1, wherein the hatrack is configured as a modular unit of an interior of the passenger cabin, and is adapted to be used in several sizes of fuselage cross sections of aircrafts.

11. A device for a passenger cabin of an aircraft, the device comprising:
an external housing;
an internal housing;
wherein the device forms a hatrack arranged above seat rows for passengers;
wherein the external housing is configured in a single piece and in conjunction with detachable holding means is indirectly or directly fastenable to a structure fixed to the aircraft;
wherein the internal housing is substantially closed except for an access opening, and is fitted in the external housing in a form-locking manner; and
first and second gear wheels at each side face of the internal housing in conjunction with first and second toothed rack guides, such that the internal housing is adjustable in a force-guided manner, the internal housing being movable between an open loading position and a closed transport position,
wherein the internal housing has a pivot located in close proximity to a centre of gravity of the internal housing and configured to move when the internal housing is moved between the open loading position and the closed transport position.

12. A method for arranging and installing a swivellable device, the swivellable device comprising an external housing and an internal housing and being arranged in a passenger cabin of an aircraft for storing luggage in a passenger cabin of an aircraft above a seat row, the method comprising:
assembling the internal housing with a servo motor associated with a shaft by an angled drive, the shaft connecting the first and second facing gear wheels positioned on the face sides of the internal housing;

joining the internal housing to the external housing, wherein the gear wheels of the internal housing engage toothed rack guides of the external housing for force-guided adjustment;

positioning the swivellable device relative to a seat row for passengers; and fastening and fixing the external housing of the swivellable device to a structure of the aircraft fuselage, the structure being fixed to the aircraft.

* * * * *